W. HANEY.
BALLOT VOTE MACHINE.
APPLICATION FILED APR. 21, 1914.

1,140,033.

Patented May 18, 1915.
6 SHEETS—SHEET 1.

Fig.1

Witnesses:

Inventor:
William Haney
By his Att'y: F.H. Richards

W. HANEY.
BALLOT VOTE MACHINE.
APPLICATION FILED APR. 21, 1914.

1,140,033.

Patented May 18, 1915.
6 SHEETS—SHEET 2.

FIG. 2

Witnesses:

Inventor:
William Haney
By his Atty;

UNITED STATES PATENT OFFICE.

WILLIAM HANEY, OF NEWARK, NEW JERSEY, ASSIGNOR TO MARY C. HANEY AND MARGARET E. BANTA, BOTH OF NEWARK, NEW JERSEY.

BALLOT-VOTE MACHINE.

1,140,033.  Specification of Letters Patent.  Patented May 18, 1915.

Application filed April 21, 1914.  Serial No. 833,358.

*To all whom it may concern:*

Be it known that I, WILLIAM HANEY, a citizen of the United States, residing in Newark, in the county of Essex and State of New Jersey, have invented certain new and useful Improvements in Ballot-Vote Machines, of which the following is a specification.

Known voting machines facilitate election frauds. They make it impossible to check the total votes for different candidates and measures against separate votes actually cast therefor, because they merely add and carry totals but make no record whatever of individual votes. Fraudulent registration and operation of such voting machines to agree therewith cannot be detected except by long and costly investigation or a new election.

My invention will prevent such frauds. It automatically records every vote cast by each voter for each name and measure as and when it is cast, and counts, adds and carries totals thereof, so that they can be instantaneously read, and keeps a consecutively-readable tally of the voters who have voted and thereby of the progress of the election. While any means for so doing would be within the scope of my invention, I prefer to do so by combining the ballot, its safety, secrecy and complete records, with machine counting, its accuracy and saving of time.

To these ends I provide a secret-vote booth, a ballot-vote and machine-count apparatus which contains a ballot-supply and a marked-ballot receptacle; ballot-feed mechanism; ballot-marking mechanism, comprising an individual marker for each name on the ballots; vote-registering and counting mechanism comprising a vote-counter for each name on the ballot and operable by the act of marking the same, and a general ballot counter; and means to permit the voter to write or paste on his ballot, names not printed thereon.

When the voting is over the results can be immediately read on the counters, and checked and corrected by counting the ballots. The ballot-counter is operable by the act of feeding a ballot to the marking mechanism and keeps an always readable, consecutive record of the ballots voted.

In the drawings Figures 1, 2 and 3 are general drawings, Fig. 1 being a front elevation with the case partly broken, Fig. 12 illustrates mounting frames for vote markers and counters and the mode of constructing the same.

The machine comprises related organizations, to each of which is assigned a characteristic base-number, used in forming its reference characters, as follows:—A case and booth-frame, 1; a tripping platform, 2, which, when a voter steps on and off it, unlocks the machine for voting and relocks it; a ballot-supply and ballot feed mechanism 3, the latter quickly adjustable in stroke to compensate for necessary and for unavoidable variations in ballot-lengths; knife mechanism 4, to cut off ballots; a traverser 5, to traverse the knife and operate various necessary or convenient latches, ballot-counting mechanism 6; marking mechanism 7, and operable thereby, vote-counting mechanism 8.

Figure 1:
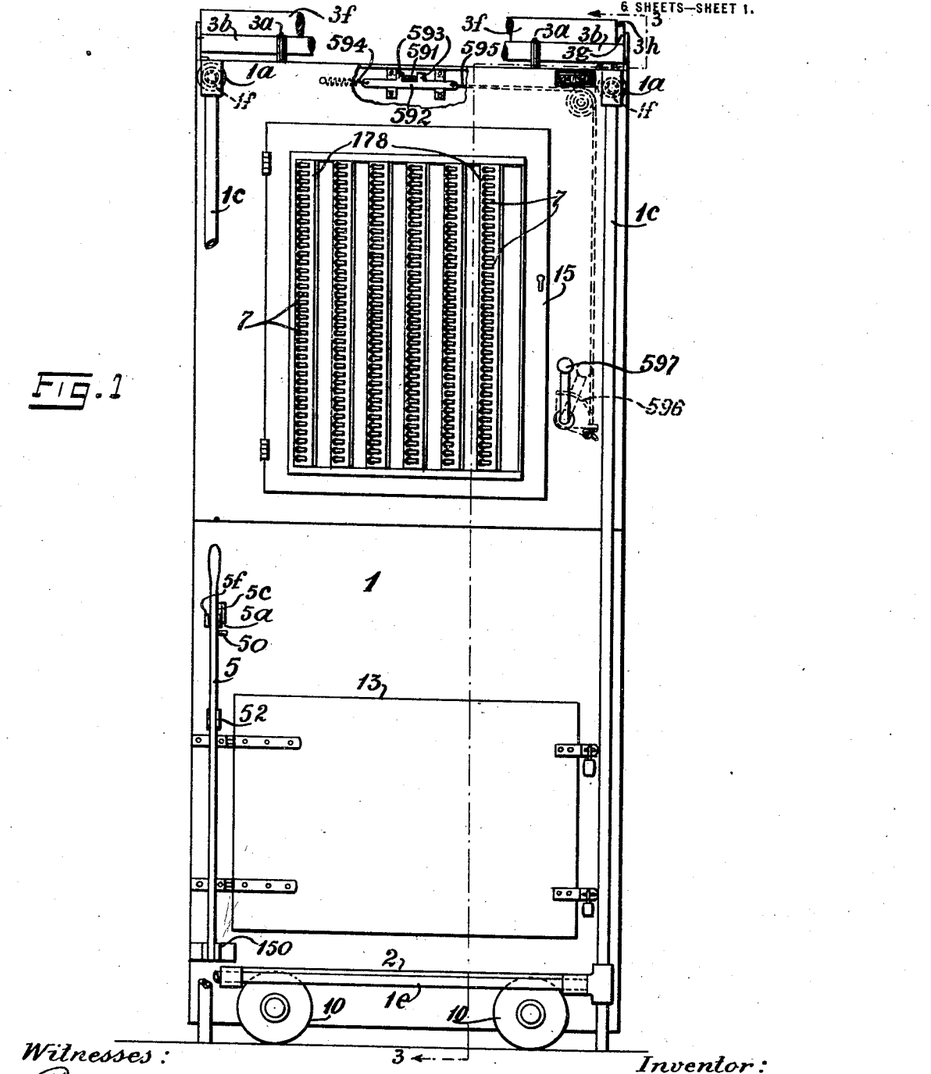
Figure 2:
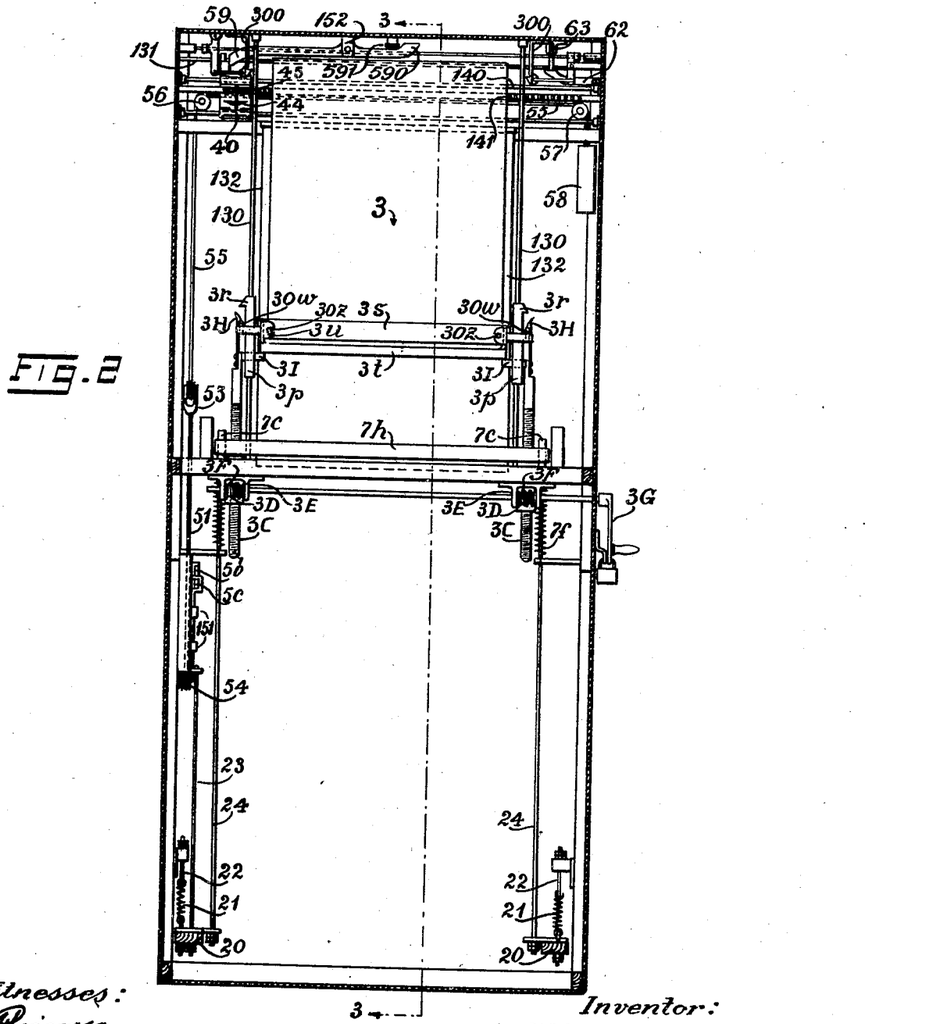
Fig. 2 is a sectional front elevation of Fig. 3, and Fig. 3 a transverse section on line 3—3 of Figs. 1 and 2.
Figure 3:
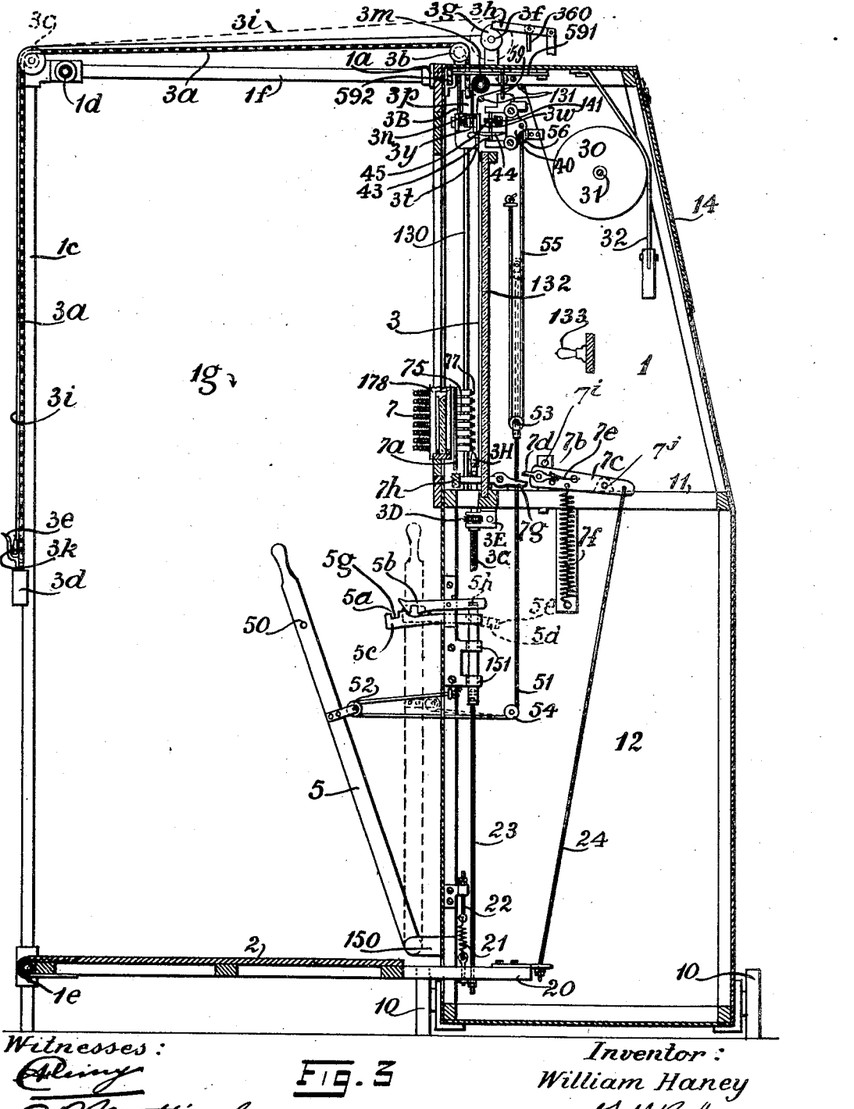

The general drawings show a closed case, 1, built of sheet metal on a light frame, mounted on wheels 10, adapted to mount all the moving parts except the platform 2, and having at about mid-height an open frame 11, and beneath it a marked-ballot receptacle, 12, accessible by a door 13; a supply door, 14 through which ballots are supplied; and a skeleton voting door 15, which constitutes a hinged mounting frame for the vote-markers and counters. These doors have suitable locks.

United to the case 1 by flanges 1ª is an open rectangular, pipe, booth-frame made of posts 1ᶜ, laterals 1ᵈ and 1ᵉ and transversals 1ᶠ. The booth has side curtains 1ᵍ; and a front curtain $3^l$ to be described. When not in use the booth-frame is knocked down; and when in use its friction with the floor is generally sufficient to prevent the machine from shifting its position; but it may be necessary, in some cases, to secure it to the floor, in a convenient manner.

*The tripping platform,* "2".—When about to vote, the voter steps on the platform 2, (Fig. 3) which is hinged, preferably on the lower frame lateral $1^e$ and whose end bars $2^o$ extend through slots in the case to balancing springs 21, adjustable by I bolts 22 and nuts. The platform is also connected by tie rods 23 and 24, respectively, with a latch $5^a$ and compound levers $7^b$ whose function will be set forth.

While the above described arrangement of the platform is the most convenient for storage, the apparatus would be equally as serviceable if it were permanently hinged on the case 1.

*Ballot supply and feed,* "3".—Ballots, 3, are supplied in a roll 30, entered through the supply door 14 and mounted by a spindle 31 in end bearings provided on the case 1. A weighted strap-brake 32 fast at one end to the case, prevents the ballots from unrolling by the momentum of the roll. The ballots 3 pass from said roll around rods, 131, to the grip-slide.

The ballot feed (Figs. 3, 4 and 5) comprises a nearly counter-balanced grip-slide $3^n$ mounted on guide-rods 130 and raised by means of a pair of chains $3^a$, attached to its ends, passing through openings in the case-top and around annular recesses in rollers $3^b$ and $3^c$ and having terminal weights $3^d$ and hooks $3^e$. To the rear of the roller $3^b$ I mount a spring curtain-roller $3^f$ having a ratchet $3^g$ engageable by a pawl $3^h$; and attached to said roller a curtain $3^i$ which passes around the roller $3^c$ and terminates in a curtain rod $3^k$ adapted to be engaged by the chain hooks $3^e$. A ballot-screen or curtain $3^m$ mounted on a spring roller adjacent to the case top, is attached to the grip-slide $3^n$. When a ballot is fed to be marked, it is adjacent to a glass marking plate 132 (whose transparency permits lighting by interior lamps) and is lighted through the glazed door 15 and if need be, by a lamp or lamps, 133, in the case.

Figures 9, 10, 11, 12:
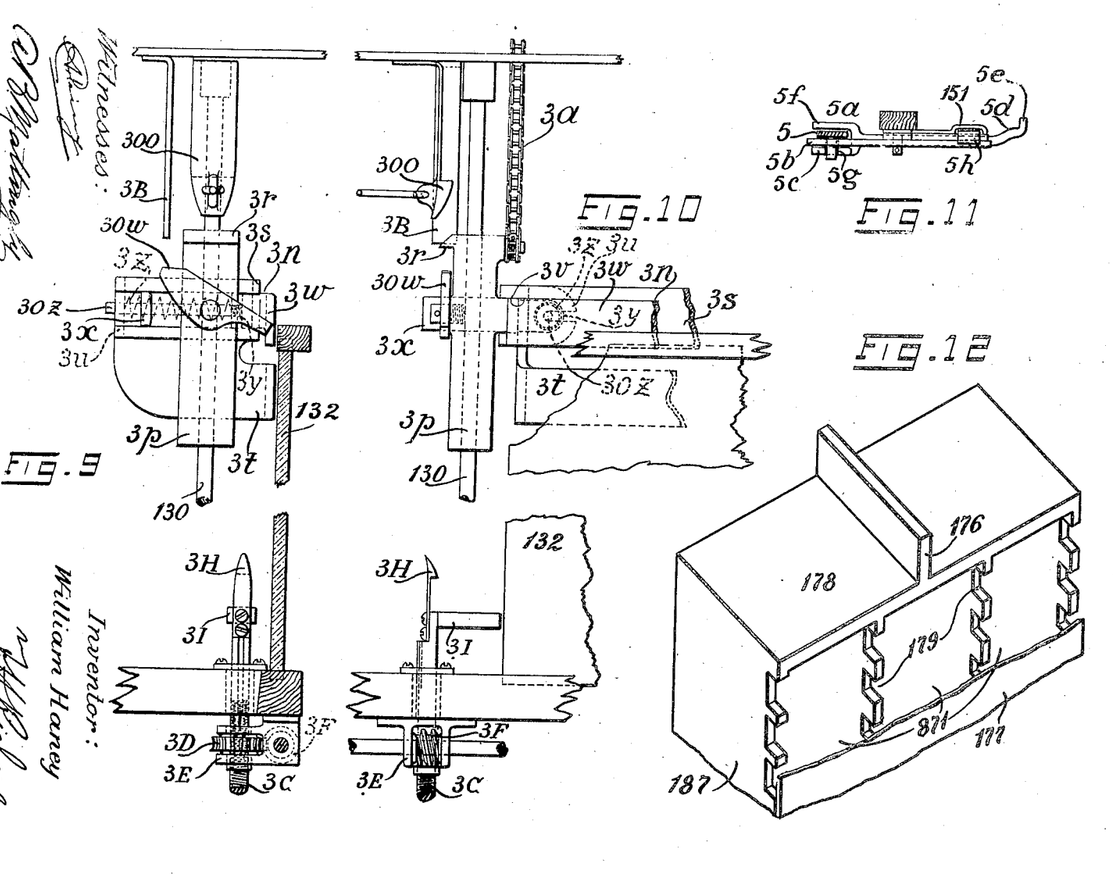

The grip-slide $3^n$ (Figs. 3 and 10) is mounted on the rods 130 and suspended to the chains $3^a$ by means of bored guide heads $3^p$ terminating in latch-hooks $3^r$, and united by a horizontal, C-shaped back-jaw $3^s$ which extends across the marking plate 132, and in such run is slotted to form a lower cross bar $3^t$ slightly offset toward said marking plate, whose ends return inward parallel therewith to form abutment ears $3^u$ and in which, inward from the heads $3^p$ are transverse slots $3^v$ (Fig. 10) for the clamp $3^w$. Said clamp is a U-shaped bar narrower than and parallel with the back-jaw $3^s$ but with its ears $3^x$ turned outwardly and with forks $3^y$ extending parallel with and inwardly from the ears $3^u$ of the back-jaw, and playing in slots $3^v$ in the transverse bends thereof. Springs $3^z$, strained between the ears $3^u$ of the back-jaw and the forks $3^y$ of the clamp release the latter and may envelop and be stayed by rods $30^z$ fixed in the back-jaw and its ears and playing through the slots of the clamp forks $3^y$.

To set the clamps to hold the ballots' leading margins, I provide lever-cams $30^w$ pivoted on the heads $3^p$ and coacting with the clamp ears $3^x$. When the grip slide approaches its upper stroke limit the clamp is set (see Fig. 9) by said cams $30^w$, which are then swung by the contact with struts $3^B$ depending from the case-top. When up, the grip slide is latched by spring latches 300 which catch the hooks $3^r$ of the heads $3^p$ and are released as will be explained. The down-stroke of the grip frame draws out and must agree with the length of ballots in order that the lines thereof may register correctly with the markers 7. Because the ballots will vary in length at different elections and from hour to hour with atmospheric conditions, it is necessary to provide adjusting means to quickly adjust the grip-stroke for different elections and in case the ballot lines and markers lose register. I therefore provide grip-stroke adjusting means (Figs. 2, 3 and 9) to be operated when desirable by an official and comprising stops $3^I$ on angularly-fixed stop-bolts $3^C$ engaging and vertically adjustable by nuts formed in worm wheels $3^D$ revoluble in bearings $3^E$ fixed to the case and meshing with and turned by a lateral worm $3^F$ mounted in bearings in the case and having outside the same a crank $3^G$ or equivalent rotating means, suitably locked against operation by unauthorized persons. Fixed to the bolts $3^C$ are spring claws $3^H$ which, when the grip is stopped on the bolts, engage the lever cams $30^w$. When the grip is drawn up the claws $3^H$ first unset the cams to release the grip, and by continued uplift thereof, are sprung out to loose said cams.

Figures 4, 5:
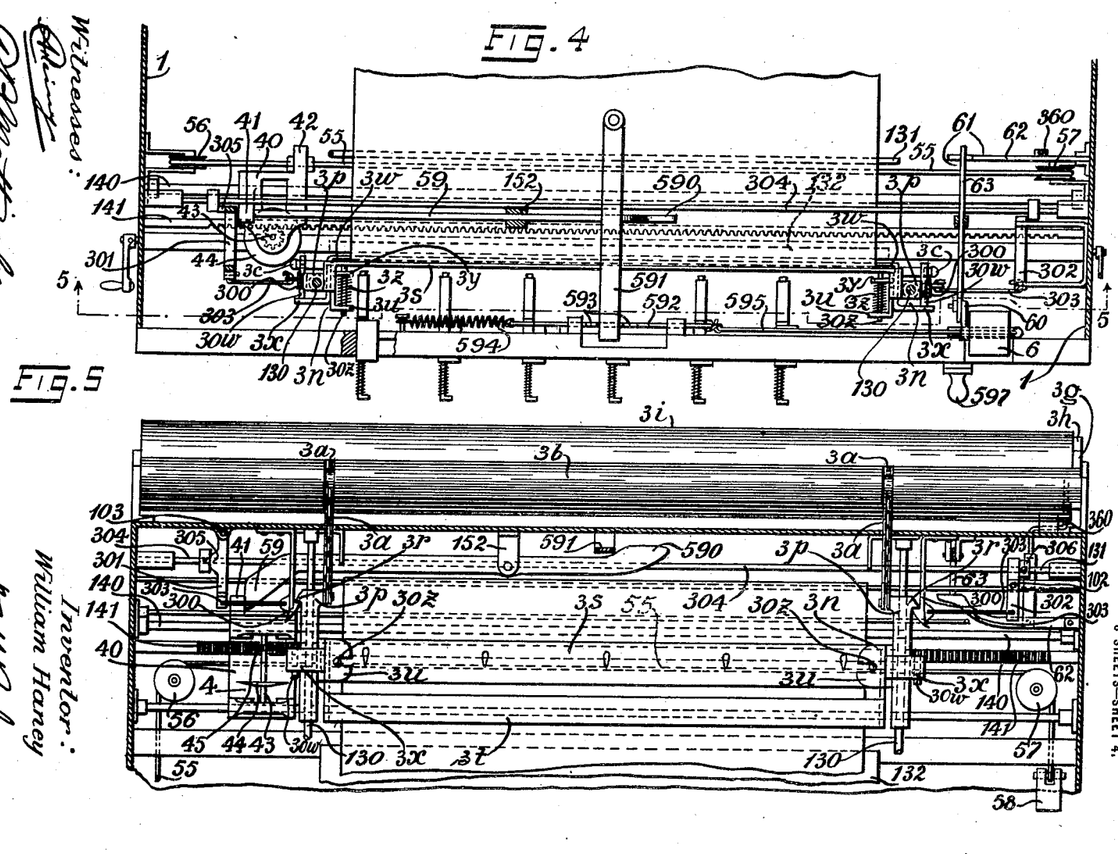
Figs. 4 to 8 inclusive are enlarged sectional views, referring to Fig. 3, Fig. 4 being a partial plan with the top plate of the case removed, Fig. 5 a corresponding partial sectional elevation at line 5—5, of Fig. 4, Fig. 6 a plan of a marker and its counter, Fig. 7 a corresponding fore-and-aft sectional elevation at line 7—7, and Fig. 8 a corresponding elevation, looking forward, of the tier of markers. The remaining figures are details, Fig. 9 being an end view of the ballot grip, Fig. 10 a view of the adjustable grip-stop and claws, Fig. 11 a plan of the traverser latch.

*Knife,* "4".—A knife mechanism, 4, cuts off ballots; and from its motions those of the grip are timed. Fixed to the sides of the case 1, near its top, are a pair of guide rods 140 and medially anterior to them a rack, 141. The sliding knife stock, 40, mounted on said rods, has functioning conformations 41, 42, to be described and anterior lugs containing bearings for the knife-spindle 43, to which are fixed the rotary knife 44 and a pinion 45, meshed with the rack 141 and thereby rotating the knife when the stock is slid. Ballots are cut when the grip slide is up; at which times its back jaw 3ᵃ is immediately above the knife and stays the ballot for cutting as best shown in Figs. 3 and 5.

*Traverser,* "5".—The knife traverser comprises a lever 5 and a counter-weighted cord, 51, running over pulleys and attached to the knife-stock 40. The lever 5 is pivoted on a bracket 150 projecting from the case 1. Between votes it is upright and locked by a twin latch 5ᵃ releasable by the weight of the voter when he steps on the platform 2, as illustrated in Fig. 3. The latch 5ᵃ (Fig. 11) comprises a downwardly-engaging, rocking latch 5ᵇ, extending from within the case through and medially pivoted in a slot in the face plate thereof and suitably limited in its motion, as by stops; and an upwardly acting limited-slide latch 5ᶜ mounted slightly to one side of and below the rocking latch 5ᵇ, in a slot formed in the case, and having at its inner end a cam face 5ᵈ and hook 5ᵉ and at its outer end a fork 5ᶠ somewhat wider than the combined thicknesses of the lever 5 and latch 5ᵇ, and whose upper face contains a notch 5ᵍ.

A spring hook 5ʰ, vertically slidable in sockets formed in a bracket 151, and between votes engaging with its hook the rocking latch 5ᵇ, is attached by the rod 23 to one platform arm 20. The lever 5 has a pin 50 adapted to engage the rocking latch 5ᵇ and the notch 5ᵍ of the slide-latch.

When no one is on the platform 2 it is upheld by its springs 21, the spring hook 5ʰ is elevated, which permits the latch 5ᵇ to fall; the lever 5 is retracted, or upright, which retracts the slide latch 5ᶜ; and the lever is securely locked by the engagement of its pin 50 with the rocking latch 5ᵃ and the notch 5ᵍ of the slide latch. The weight of a voter stepping on the platform 2 depresses it, and rocks the latch 5ᵃ to free the lever 5, which the voter then grasps and rocks to the position shown in full lines. In so doing he pulls out the slide latch 5ᶜ whose cam 5ᵈ extrudes the spring hook 5ʰ and frees the latch 5ᵇ, which rocks to engaging position. The slide latch when fully extended is stopped by its hook 5ᵉ and its play in its mounting slot permits its fork to fall and free the lever 5.

To cause a long traverse of the knife by a short swing of the lever 5, the cord 51 runs around multiplying sheaves 52 and 53. The cord is fast at one end to the case 1, and thence runs around a sheave 52 attached to the lever 5, and a pulley 54 on the case and has at its other end a block, 53, which, when the lever 5 is swung, moves twice as far as the sheave 52. A second cord 55 is fast at one end to the case, thence runs through the block 53, around a case pulley 56, is attached to the knife stock 40, and thence runs to a final pulley 57 and counterweight 58. When the handle is swung out it pulls the cords and traverses the knife stock from left to right, where it is held by a latch 59, medially pivoted on a bracket 152, and having a releasing head 590. When the knife stock is unlatched, as hereafter described, the counterweight 58 pulls it to the right, to sever the ballot, and simultaneously retracts the lever 5 into the fork 5ᶠ of the slide latch 5ᶜ and retracts said slide with the lever, whose pin engages the rocking latch 5ᵇ and the notch 5ᵍ.

To release the knife-stock a trip bar 591, pivoted at one end on the case top, extends anteriorly above the latch 59, and is engaged by a draw bar 592 (Figs. 1, 3, 4 and 5) mounted in guides on the case-face and having fingers 593 which limit its motion in its guides and also engage the trip rod. The draw bar is retracted by a spring 594 and advanced by a cord 595 connecting it with a segmental rocker 596 pivoted in the case and having a handle 597 exterior thereto. At the end of its idle or right-to-left stroke, the knife-stock 40 frees the grip 3ⁿ from the latches 300, by operating a pair of connected levers, 301 and 302, respectively, hooked by links 303 to said latches and connected by a connecting-rod 304, slidably mounted in the case 1. The left-hand lever 301 is offset, pivoted at 103, depends into the path of and is swung by the stock conformation 41 to release the latches and slides the connecting rod 304 by medially coacting with a shoulder 305 thereon. The right-hand lever 302, which is medially pivoted at 102, is engaged and moved by a shoulder 306 on said rod.

*Ballot counter* "6".—To consecutively and readably record the number of ballots voted, so that the progress of the election may be known at any time, I provide and operate from the knife stock, at the end of its cutting or left-to-right stroke, a mechanical counter 6, (Fig. 4) of known type, whose crank 60 is rocked by an action 61 illustrated as comprising a primary lever 62 pivoted on the case and operable by the stock-conformation 42, and an intermediate lever 63 medially pivoted on the case-top, coacting at one end with the primary lever and at the other connected (as by a slot and pin) with the counter crank 60. Medially pivoted on the primary lever 62 is a link 360 which extends through the case and is connected with and lifts the pawl 3ʰ.

*Vote-markers* "7" *and vote-counters* "8".—These are combined, so that the act of marking a vote for any name or topic on the regular ballot causes the corresponding counter to register. See Figs. 6, 7 and 8. Flanged to the skeleton voting door 15 (Fig. 1) are a series of box frames 178 in which the markers and their counters are mounted in columns and rows corresponding respectively with regular party tickets and the candidates' names, or measures to be voted on.

Slidably mounted on the back plates, 187 of the frames 178 are catch plates $7^a$. Registering marker sockets are formed in the plates of the frames and in the catch plates, those in the front plates being working fits with the marker; but those in the back and catch plates, while working fits, measured in a lateral direction with the width of the columns, and when in register, permit free retraction of the marker with its spring catch extended above such marker.

Each marker 7 is slidable in sockets in a frame 178 and catch-plate $7^a$, retracted by a spring 74 and comprises an angularly-fixed slide 70 and thereon a counter pin 71, a marker-pin 72 and a spring catch 73 retractable into a slot; and movable on the inner end thereof and extensible by a spring 78, a tubular pencil holder 75 having in its wall a helical slot 76 and fixed in its end a suitable graphite or crayon pencil 77, backed by a hard washer 79 against which the spring 78 bears. Pushing in the slide 70 first punches the pencil 77 against the ballot 3 and the latter against the marking plate 132 and subsequently, to insure legible marking, rotates the holder and pencil by coaction of the marker pin 72 and holder slot 76.

Figures 7, 8:
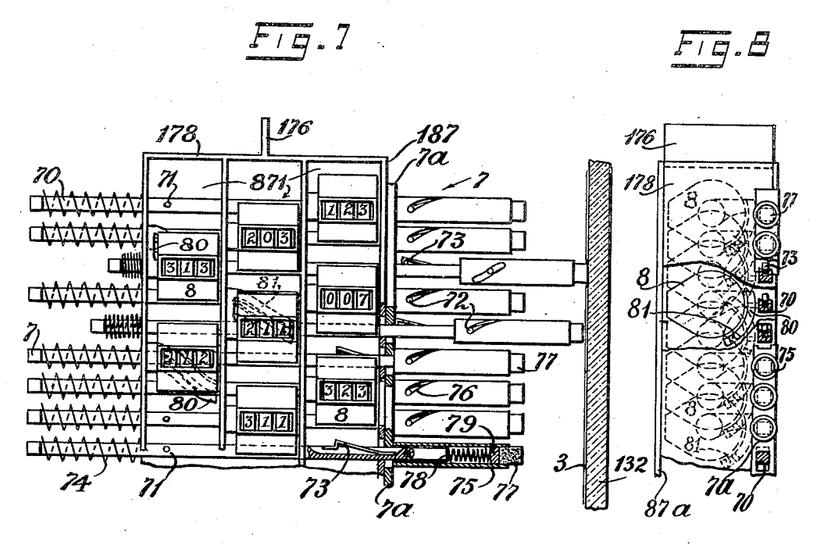

*Vote-counters* "8."—Because each party ticket may contain between fifty and a hundred names and there must be a marker for each and also one for voting each straight ticket and "Yes" and "No" markers for other purposes, the number of vote-markers and vote-counters may be so great that they must be as small and closely set as is compatible with convenient operation and durability. The vote counters 8 are necessarily relatively large; and to provide room for them the frames 178 are made with a plurality of compartments, 871, in this instance three, and the counters are stepped as shown in Fig. 7. They are suitably fixed in the frames all reading to the same side and with their axes parallel with the marker slides; and their cranks 80 contain helical slot cams, or thread-sections 81, each engaged and swung to operate the counter by the counter-pin 71 of the corresponding marker, when it is pushed in.

Fig. 3 illustrates the action of the catch plates $7^a$ to engage and release advanced markers. Operably connected with the platform 2 and catch plates $7^a$, to cause the latter to release advanced markers when a voter steps on the former, are a pair of compound levers $7^b$ medially pivoted on the frame 11. The primary lever $7^c$ of each compound lever has one end connected by a rod 24 with the platform bars 20; at the other has a latch $7^d$ settable against a stop by a spring $7^e$, to permit the latch $7^d$ to pass and engage the release lever $7^g$; is engagingly positioned by a spring $7^f$, and its stroke is suitably limited by stops $7^1$ and $7^1$ (Fig. 3). The release levers $7^g$ are rocked as aforesaid and connected by a release bar $7^h$ which lifts the catch plates $7^a$ to release catches 73 of advanced markers engaged thereby.

The operation of the machine is as follows:—To prepare for voting, the knife stock 40 is drawn to the left and the grip $3^n$ drawn down to the stop bolts $3^o$, which retracts the chains $3^a$ and rolls up the curtain $3^l$; the ballot roll 30 is inserted through the ballot door 14, mounted by its spindle 31, stayed by the strap brake 32 and (the voting door 15 being open) its leading edge is passed over the guide rods 131 and set in the grip (to a mark on the ballot) by setting the grip cams $30^w$ and engaging them with the claws $3^H$; the grip-stop bolts $3^o$ are adjusted to register the ballot lines and markers, the ballot screen is drawn down and attached to the grip; the doors are closed and locked; and, all counters being set at zero, the frames 178, with the markers 7 and vote counters 8, are fixed to the voting door 15. All is now ready for the vote. The voter steps upon the platform 2; his weight causes it to set the compound lever $7^b$ for subsequent operation and rocks the latch $5^b$ to release the lever 5: he grasps and swings out the lever 5 thereby pulling the cords 51, 55 (out and down, which would ordinarily traverse the knife stock 40 to the left) and grasps and pulls down the front curtain $3^l$ and with it the chains $3^a$ and raises the grip $3^n$ thereby, firstly, causing the claws $3^H$ to unset the clamp cams $30^w$ to permit the springs $3^z$ to open the clamp $3^w$ and free the ballot margin; secondly, as the grip approaches the upper limit of its stroke, by their contact with the struts $3^B$, setting said cams and clamp to grip another ballot; and finally engaging the grip slide with the latches 300 and the curtain roller ratchet $3^g$ with the pawl $3^h$. The ballot screen $3^m$ having been raised with the grip slide, the ballot is now visible and the voter, reading it, pushes in markers 7 to mark on the ballot the votes he wishes to cast. As each slide is punched in its spring catch 73 is retracted by and passes the catch plate $7^a$ and the pencil 77 is first pushed into elastic contact with the ballot 3 and then twisted by the pin 72 and slot 76, to insure a mark. When the voter releases a marker its spring 74 retracts it until its catch 73 touches the catch plate $7^a$ and its pencil 77 clears the ballot (Fig. 7). When he has voted he grasps and swings the crank handle 597, to operate the draw bar 592 and trip bar 591, trip the latch 59 and release the knife stock 40, whose counterweight 58 traverses the stock and knife 44 from left to right to sever the marked ballot (which drops into the receptacle 12) and simultaneously retracts the hand lever 5 which engages the fork of the slide latch 5ᶜ, retracts it and is engaged, retracted, by the twin latch 5ᵃ. At the right-hand limit of its stroke the knife-stock 44 operates the action 61, which simultaneously operates the ballot counter 6 to register one ballot and, by the shoulder 306, trips the pawl 3ʰ and releases the curtain roller 3ᶠ, which rolls up the front curtain 3ⁱ and lifts its heavy rod 3ᵏ from the hooks 3ᵉ of the chains 3ᵃ, leaving the elevated grip 3ⁿ engaged with the pawls 300, the chains extended, and the knife stock 40 to the right. The voter then steps off the platform 2, which, lifted by its springs 21, releases the compound levers 7ᵇ and permits their springs 7ᶠ to operate them, lift the cross bar 7ʰ and catch plate 7ᵃ and free the advanced markers 77, which are retracted by their springs 74. The machine is now ready for the next voter, who steps upon the platform 2 and thereby causes the twin latch 5ᵃ to release the hand lever 5; and rocks said lever and thereby traverses from right to left the knife stock, which at the limit of its motion retracts the latches 300 and frees the grip 3ⁿ, which falls and draws down a ballot and the ballot screen 3ᵐ. The descending grip contacts with the bolt stops 3ᶜ and engages its cams 30ʷ with their claws 3ᴴ. The ballot being screened, before he can see it and vote he must pull out the front curtain 3ⁱ and chains 3ᵃ; pull the grip from the claws 3ᴴ, which release the clamp and leave the ballot hanging free; and fully raise the grip to engagement with the succeeding ballot, thus raising the screen 3ᵐ. Thereafter voting proceeds as above described.

The marker frames 178 (Figs. 6 and 12) are preferably cast with attachment flanges 176 and open on both sides. The marker sockets 179 are cut with a gang miller (the plates being suitably stayed with liners), the frames being slightly shifted to permit enlargement of the sockets in the back plate 187 by a second cut to give clearance for the spring catches 73. After the marker slides 70 (preferably square bars) are laid in the sockets, they are retained by a suitably secured cover, 177.

Figure 6:
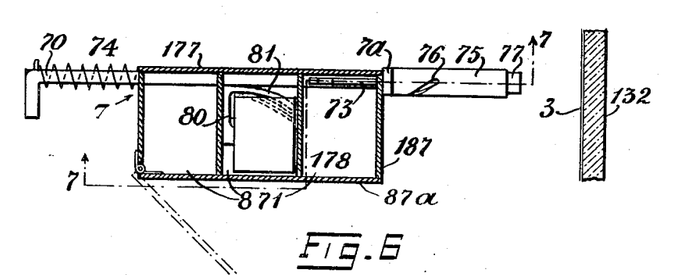

For protection against manipulation of the vote counters 8, I have provided a door 87ᵃ which covers the compartments 871. This door may be hingedly mounted to one of the side frames 178, as is indicated in Fig. 6, and may be locked in closed position by any suitable locking means. This door may serve for other uses than just described. For instance, there may be arranged on the inside of the door opposite the respective counters the names of the different candidates to which each counter relates, so that when the door is open the votes for each respective candidate may be immediately noted.

Having thus described my invention, I claim:—

1. A voting machine adapted to receive a strip of attached ballots, means for feeding such strip of attached ballots into vote recording position, and means for severing a ballot from such strip after a vote has been marked, the strip feeding means being operated by the severing means when said severing means are returned to initial position.

2. In a voting machine adapted to receive a strip of attached ballots on which a vote may be recorded, the combination with means for severing a ballot from such strip after a vote has been recorded thereon, of a counter operated by such severing means and adapted to keep a consecutively-readable record of the number of voters who have voted.

3. A voting machine adapted to receive a strip of attached ballots, means for feeding such strip of attached ballots into vote recording position, vote recorders for recording votes on the ballots so fed, and vote counting means adapted to count and carry totals of such votes operated by such vote recorders.

4. A voting machine adapted to receive a strip of attached ballots, means for feeding such strip of attached ballots into vote recording position, vote recorders for recording votes on the ballots so fed, means for severing a ballot from such strip after a vote has been recorded thereon, a counter operated by such severing means adapted to keep a consecutively-readable record of the number of voters who have voted, and vote counting means adapted to count and carry totals of such votes operated by such vote markers.

5. A voting machine having means to support a supply of customary ballots having blank spaces thereon opposite names of candidates, ballot-feed means, vote-markers for marking votes on ballots so supplied and fed, and register-adjustment means operable to correct faulty registering of such ballots and markers, so that said spaces will register with corresponding vote markers.

6. In a voting machine, means to support a supply of customary ballots having blank spaces thereon opposite names of candidates, ballot-feed means comprising a grip to hold the leading margin of ballots and means to traverse said grip, vote-markers for marking votes on ballots so supplied and fed, and register-adjustment means comprising adjustable stops to limit the stroke of said grip, and manually-operable means to adjust said stops, so that said blank spaces will properly register with said vote markers.

7. In a voting machine, means to support a supply of customary ballots having blank spaces thereon opposite names of candidates, ballot-feed means comprising a grip to hold the leading margin of ballots and means to traverse said grip, vote-markers for marking votes on ballots so supplied and fed, and register-adjustment means so that said blank spaces will properly register with said vote markers, said adjustment means comprising adjustable stop-bolts to limit the stroke of said grip, axially-fixed nuts engaging said bolts, and manually-operable means for rotating said nuts.

8. In a voting machine, means to support a supply of customary ballots having blank spaces thereon opposite names of candidates, ballot-feed means comprising a grip to hold the leading margin of ballots and means to traverse said grip, vote markers for marking votes on ballots so supplied and fed and register-adjustment means so that said blank spaces will properly register with said vote markers, said adjustment means comprising adjustable stop-bolts to limit the stroke of said grip, axially-fixed nuts engaging said bolts, and worm gearing operably connected with said nuts.

9. A voting machine comprising a case, a movable voter's platform exterior thereto; ballot-supply-means within said case; means for feeding a ballot into reading position, operating means for operating said ballot feed means located in initial position when said platform is raised or unoccupied, and releasing means operably connected to said platform and connected to release said operating means when said platform is depressed after which the operating means may be operated to actuate said ballot feeding means.

10. A voting machine comprising a case; a movable voter's platform exterior thereto; an upright marking-plate in reading position before the voter, ballot supply means within said case, means for feeding a ballot into position on said upright marking-plate, vote-markers extending through the wall of said case for marking ballots so supplied and fed; and operably connected with said platform, marker engaging and releasing means adapted to engage advanced markers and operable by a motion of said platform to release the same.

11. A voting machine comprising a case; a movable voter's platform exterior thereto; an upright marking-plate in reading position before the voter, ballot supply means within said case, means for feeding a ballot into position on said upright marking-plate, vote-markers extending through the wall of said case for marking ballots so supplied and fed; a member adapted to engage and release advanced markers, and a link and lever connection between said lever and platform operable by a motion of the latter to cause said member to release said markers.

12. A voting machine comprising a case; a movable voter's platform exterior thereto; an upright marking-plate in reading position before the voter, ballot-supply means within said case, means for feeding a ballot into position on said upright marking-plate, vote-markers extending through a wall of said case for marking ballots so supplied and fed, a slide adapted to engage advanced markers and stay them slightly retracted from ballots marked by them; and an operative connection between said platform and slide for shifting it by a motion of said platform to release said markers.

13. A voting machine comprising a case; a movable voter's platform exterior thereto; within said case ballot-supply and ballot-feed means; vote markers extending through a wall of said case for marking ballots so supplied and fed; a slide adapted to engage advanced markers and stay them slightly retracted from ballots marked by them; a lever operably related with said slide; operably connected with said platform a lever, and thereon a latch adapted to pass and engage said first-named lever.

14. A marker-and-counter mounting frame for ballot-vote machines, comprising end plates, parallel plates joining the same and having linear series of marker-notches formed in their margins, and a cover plate secured to and closing one side of said frame, to confine markers in said notches.

15. A ballot-vote machine comprising a case, therein a transparent-plate against which to mark ballots to permit light to reach said ballots and thus facilitate reading the ballots in a dimly lighted voting booth, ballot-supply means, ballot-feed means adapted to locate ballots adjacent to said plate for marking, series of marker frames removably positioned adjacent to said marking plate, and ballot-markers mounted in said frames.

16. A ballot-vote machine comprising a case, therein a glass plate against which to mark ballots to permit light to reach said ballots and thus facilitate reading the ballots in a dimly lighted voting booth, ballot-supply means, ballot-feed means adapted to locate ballots adjacent to said plate for marking, series of marker frames removably positioned adjacent to said glass plate, and ballot-markers mounted in said frames.

17. A ballot-vote machine comprising a case, therein a glass-plate against which to mark ballots, a lamp behind said glass-plate the light of which passes through said glass-plate and illuminates the ballot to facilitate reading the ballot in a dimly lighted voting booth, ballot-supply means, ballot-feed means adapted to locate ballots adjacent to said plate for marking, series of marker frames removably positioned adjacent to said marking plate and ballot-markers slidable in said frames.

18. A ballot-grip for ballot-vote machines, adapted to be slidably mounted therein and to automatically engage and to advance ballots between markers and a marking plate, and comprising guide heads, a back jaw-plate, a clamp mounted operably relatively to said jaw-plate, automatic clamp-setting means to automatically set said clamp at one and unset at the other end of the grip's stroke, and means to traverse said grip.

19. Ballot supply and ballot-feed mechanism for ballot-vote machines characterized by a case containing a marking plate, and comprising ballot-roll mounting means, a slidable ballot-grip adapted to automatically engage and locate ballots on said markers and marking plate, a ballot-cutting knife adapted to be traversed across ballots so located, means to traverse said grip and knife and means operatively connected to said knife for releasing said ballot grip to locate a ballot.

20. Ballot-cutting knife mechanism for ballot-vote machines adapted for mounting a roll of ballots and having a ballot-feed to advance the same, said mechanism comprising parallel guides and a rack fixed to the machine-case transverse to the feed-direction; a knife-stock slidable on said guides; revoluble in said stock a spindle and thereon a discoidal knife and a pinion meshed with said rack; and means to traverse said stock.

21. Ballot-feed mechanism for ballot-vote machines characterized by a case adapted for mounting a roll of ballots, and comprising guides fixed to said case parallel with the feed-direction; a ballot-grip slidable on said guides; a latch-engagement attached to said case to engage said grip when retracted; guides fixed to said case transverse to the feed-direction; mounted thereon a knife-stock operably mounting a knife; disengaging means operably connecting said knife-stock and latching engagement; and means to traverse said knife-stock and grip.

22. Ballot-feed mechanism for ballot-vote machines characterized by a case adapted for mounting a roll of ballots, and comprising guides fixed to said case parallel with the feed-direction; a ballot-grip slidable on said guides; a latch-engagement attached to said case to engage said grip when retracted; means to slide said grip; guides fixed to said case transverse to the feed-direction; mounted thereon a knife-stock operably mounting a knife; a latch to latch the knife-stock prior to its cutting stroke; disengaging means operably connecting said knife-stock and latching engagement; and an operable connection between the knife-traversing means and the knife-stock-latch.

23. Ballot-feed mechanism for ballot-vote machines characterized by a case adapted for containing the same and mounting a roll of ballots, and a booth-frame, said mechanism comprising guides fixed to said case parallel with the feed-motion; a ballot-grip slidable on said guides; counterweighted chains connected with said grip, passing around rollers to the face of said booth-frame, and thereon terminal hooks; a latch-engagement attached to said case to engage said grip when retracted; a spring curtain-roller on said case and thereon a ratchet and a curtain advanceable with said chains and on said curtain a rod adapted to engage said chain-hooks; guides fixed to said case transverse to the feed-direction; mounted thereon a knife-stock operably mounting a knife; disengaging means operably connecting said knife and grip-latch engagement; a pawl adapted to engage said curtain rod ratchet and releasable by a motion of said knife-stock; and means to traverse said knife-stock.

24. In a ballot-vote machine, having a case adapted for mounting a ballot roll, the combination therewith of a movable voter's platform; fixed guides; a knife stock slidable thereon and operably mounting a knife; a hand-lever pivoted on said case; a latch adapted to lock said lever and unlockable by a motion of said platform; and counterweighted flexible connections between said lever and knife-stock.

WILLIAM HANEY.

Witnesses:
JOHN MORRIS,
H. D. PENNEY.